United States Patent [19]
Logeman et al.

[11] Patent Number: 5,813,517
[45] Date of Patent: Sep. 29, 1998

[54] VIBRATORY PARTS FEEDING SYSTEM

[75] Inventors: Robert M. Logeman; Douglas C. Logeman; Robert G. Price; Roy W. Howitt, all of Greensboro, N.C.

[73] Assignee: Chase-Logeman Corporation, Greensboro, N.C.

[21] Appl. No.: 599,674

[22] Filed: Feb. 12, 1996

[51] Int. Cl.$^6$ ................................................. B65G 27/08
[52] U.S. Cl. ............................................ 198/759; 198/757
[58] Field of Search .................................. 198/756, 757, 198/759, 763

[56] References Cited

U.S. PATENT DOCUMENTS

| | | | |
|---|---|---|---|
| 2,845,168 | 7/1958 | Smith et al. | 198/757 |
| 3,200,941 | 8/1965 | Heyer | 198/757 |
| 3,360,109 | 12/1967 | Bryner et al. | 198/220 |
| 3,572,736 | 3/1971 | Lynch et al. . | |
| 3,613,571 | 10/1971 | Russell et al. . | |
| 3,613,870 | 10/1971 | Burgess, Jr. . | |
| 3,845,857 | 11/1974 | Doty . | |
| 3,954,169 | 5/1976 | Clark . | |
| 4,290,179 | 9/1981 | Bakermans et al. . | |
| 4,880,106 | 11/1989 | Falconer et al. . | |
| 4,913,281 | 4/1990 | Muller . | |
| 5,001,423 | 3/1991 | Abrami et al. . | |
| 5,062,386 | 11/1991 | Christensen . | |
| 5,103,962 | 4/1992 | Voss et al. . | |
| 5,112,628 | 5/1992 | Conrad . | |
| 5,213,200 | 5/1993 | Fishman et al. . | |
| 5,281,794 | 1/1994 | Uehara et al. . | |
| 5,285,890 | 2/1994 | Stearns . | |
| 5,445,261 | 8/1995 | Kimura . | |
| 5,456,438 | 10/1995 | Long . | |

FOREIGN PATENT DOCUMENTS 43 14 660  11/1994  Germany .

*Primary Examiner*—James R. Bidwell
*Attorney, Agent, or Firm*—Rhodes Coats & Bennett, L.L.P.

[57] ABSTRACT

A vibratory parts feeding system having a vacuum hold down system for operatively attaching feeding bowls and tracks to vibratory base drives. The hold down system comprises an upper plate and a lower plate in confronting relation to each other. The upper plate is adapted along its upper surface for attachment to a feeder bowl, and the lower plate is adapted along its lower surface for attachment to a vibratory base drive. A vacuum port is located between the upper and lower plates through which a vacuum is applied. The periphery of the plates is sealed when a vacuum is applied to the upper and lower plates by a vacuum source, resulting in a coupling of the feeder bowl to the base drive and the transmission of the vibrations from the base drive to the feeder bowl. To facilitate alignment of the feeder bowl to the base drive, dowel pins and guide blocks are positioned along the outer edge of the lower plate to limit rotational movement and prevent damage to gaskets located between the upper and lower plates. The vacuum hold down system further includes a feeder track positioned adjacent to and in alignment with the feeder bowl.

32 Claims, 2 Drawing Sheets

VIBRATORY PARTS FEEDING SYSTEM

BACKGROUND OF THE INVENTION

(1) Field of the Invention

The present invention relates generally to a vibratory parts feeding system and, more particularly, to a vacuum hold down system for connecting the parts feeder bowls and tracks to the vibratory base drives.

(2) Description of the Prior Art

Vibrating feeding systems are used in many industries to sort and convey articles from one location to another. Maintaining a sterile environment for such feeding systems is particularly critical for the pharmaceutical industry and assembly industries involving electrical components. Typically, in pharmaceutical processing, a parts feeder bowl is removed daily, and sometimes more often, for cleaning, sterilizing and/or product changeover. The feeder bowl is typically secured to its vibratory base drive by bolts or similar means. Thus, tools such as wrenches must be used to remove the feeder bowl from the base drive and to tighten the feeder bowl upon re-installation. Since the feeder bowl is removed often during normal operation of a feeding system, attachment and re-attachment of the feeder bowl is particularly time-consuming in sterile environments such as a pharmaceutical filling room.

On the average, the amount of time required to perform such a changeover of the feeder bowl in a sterile environment is on the order of 20 minutes. Further, the tools that are used to attach and re-attach the feeder bowl to the base drive require sterilization before use. In effect, the current system for product changeovers and cleaning is time-consuming and inefficient. As industries move toward complete automation for manufacturing products, the conventional methods for securing a parts feeder bowl to a vibratory base drive using tools will likely become more inefficient. In robotics, the twisting motion and force necessary to tighten a bolt is very difficult.

Thus, there remains a need for a new and improved vibratory parts feeding system which does not require long changeover times or tools for performing the changeover while, at the same time, is suitable for automation and other difficult environments.

SUMMARY OF THE INVENTION

The present invention is directed to a vibratory parts feeding system which overcomes the disadvantages associated with conventional product changeover systems by providing a quick and efficient system to operatively connect a parts feeder bowl to the vibratory base drive without using tools. With existing changeover systems requiring as long as 20 minutes to attach a feeder bowl to its base drive, the inventors have discovered a system for attaching feeding systems to their base drives which can be achieved in as little as 20 seconds.

To this end, the present invention is directed to a vacuum hold down system for vibratory feeding systems. The vacuum hold down system comprises at least two plates, an upper plate and a lower plate, approximately of the same dimensions with each having at least one groove. The upper and lower plates are constructed to accommodate a predetermined feeder bowl and drive size. Use of the upper and lower plates allow conventional attachment systems, which require tools, to be modified and retrofitted to connect existing feeder bowls.

In the present invention, the upper plate is suitably configured for attachment to and to receive a feeder bowl, while the lower plate is also configured for attachment to a vibratory base drive. To facilitate alignment of the feeder bowl and base drive, the lower plate comprises at least two dowel pins positioned diagonally along its outer edge, which fit into corresponding holes in the upper plate upon alignment of the plates. As a further means to ensure proper alignment and to prevent motion between the upper and lower sections of the feeding system, at least three guide blocks are attached to the outer edge of the lower plate. Each guide block also includes a projecting tab and recess. To position the feeder bowl with the attached upper plate over the base drive with the attached lower plate, the tab mount surfaces of the upper plate and guide blocks are contacted, and the feeder bowl is rotated until the each of the tab mounts on the base of the feeder bowl locks into a corresponding recess on the lower plate. This allows the bowl to rotate into position without damaging the O-ring since only vertical motion is applied to the O-ring gasket.

To facilitate the use of a vacuum to hold down the feeding components of the system, a gasket is located in the groove of either the upper or lower plates, which helps to create a pressure-tight seal therebetween. In the preferred embodiment, there are complementary grooves in both the upper and lower plate. This arrangement results in a vacuum seal within the grooves, thereby further ensuring good metal-to-metal contact between the upper and lower plates. Further, a vacuum port is positioned in the lower plate through which a vacuum pressure is applied and gas is removed. Any standard vacuum source may be used to supply the vacuum to the feeder bowl and base drive. When the vacuum source is in operation and a sufficient vacuum is applied ranging between about 15 to about 28 inches of mercury, gas is exhausted from the grooves of the plates. As a result, there is secure coupling of the feeder bowl to the base drive and vibrations from the base drive are then transmitted to the feeder bowl.

In one embodiment of the present invention, a feeder track is positioned adjacent to and in alignment with the outlet of the feeder bowl. The track is situated on a base support which also includes a groove seal and a vacuum port. In another embodiment of the invention, the upper plate may be sterilizable. In yet another embodiment, the lower plate is normally non-sterilizable and may be made a permanent part of the base drive.

Accordingly, one aspect of the present invention is to provide a vibratory parts feeding system. The apparatus includes: (a) a feeder bowl having a bottom and a generally inverted frusto-conical side wall with a spiral shaped track extending around the inner periphery of the cylindrical wall to an outlet; (b) a vibratory base drive; (c) a feed track positioned adjacent to and in alignment with the inlet thereof aligned with the outlet of the feeder bowl; (d) a vibratory track drive; and (e) a vacuum hold down system for attaching the feeder bowl to the vibratory base drive, the vacuum hold down system including: an upper plate and a lower plate having confronting surfaces, the upper plate receiving the feeder bowl onto its upper surface and the lower plate being configured on its lower surface to mount to the base drive; the upper and lower plates, when assembled, having a chamber therebetween and being sealed therearound and a vacuum port in one of the upper and lower plates through which negative pressure is applied and gas is removed; whereby the feeder bowl is coupled to the base drive and the vibrations of the base drive are transmitted to the feeder bowl.

Another aspect of the present invention is to provide a vacuum hold down system for attaching a fixture to a vibratory base drive. The apparatus includes: (a) an upper plate and a lower plate having confronting surfaces, the upper plate being suitably adapted along its upper surface to receive the fixture and the lower plate being suitably adapted along its lower surface to mount to the vibratory base drive; (b) the upper and lower plates, when assembled, having a chamber therebetween and being sealed therearound; (c) a vacuum port positioned in one of the upper or lower plates through which negative pressure is applied and gas is removed; and (d) a vacuum source for supplying sufficient pressure through the vacuum port, whereby when the upper and lower plates are in sealed contact along their interior surfaces and the vacuum source is in operation, gas is removed from the chamber, resulting in the coupling of the plates and the fixture to the base drive and the transmission of the vibrations from the base drive to the fixture.

Still another aspect of the present invention is to provide a vibratory parts feeding system. The apparatus includes: (a) a feeder bowl having a bottom and a generally inverted frusto-conical side wall with a spiral shaped track extending around the inner periphery of the cylindrical wall to an outlet; (b) a vibratory base drive; (c) a feed track positioned adjacent to and in alignment with the inlet thereof aligned with the outlet of the feeder bowl; (d) a vibratory track drive; (e) a vacuum hold down system for attaching the feeder bowl to the vibratory base drive, the vacuum hold down system including: (i) an upper plate and a lower plate having confronting surfaces, the upper plate being suitably adapted along its upper surface to receive the fixture and the lower plate being suitably adapted along its lower surface to mount to the vibratory base drive; (ii) the upper and lower plates, when assembled, having a chamber therebetween and being sealed therearound; (iii) a vacuum port positioned in one of the upper or lower plates through which negative pressure is applied and gas is removed; and (iv) a vacuum source for supplying sufficient pressure through the vacuum port, whereby when the upper and lower plates are in sealed contact along their interior surfaces and the vacuum source is in operation, gas is removed from the chamber, resulting in the coupling of the plates and the feeder bowl to the base drive and the transmission of the vibrations from the base drive to the feeder bowl; and (f) a positioning system for aligning the feeder bowl with respect to the vibratory base drive.

These and other aspects of the present invention will become apparent to those skilled in the art after a reading of the following description of the preferred embodiment when considered with the drawings.

DESCRIPTION OF THE PREFERRED EMBODIMENTS

Figure 2:
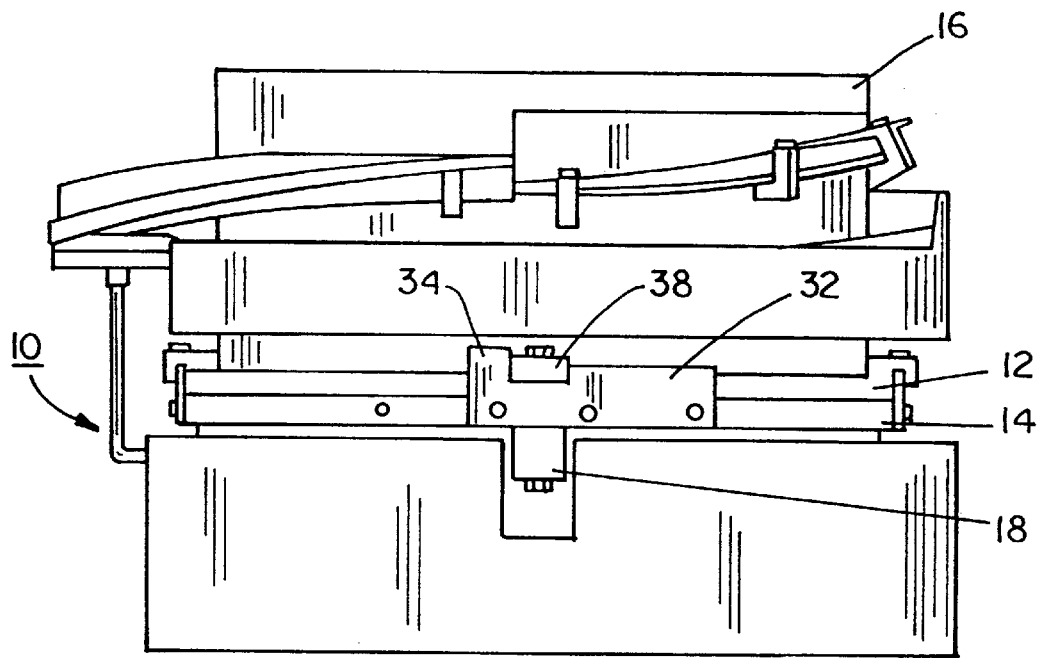
FIG. 2 is a side elevational view of the vacuum hold down system for attaching a feed bowl to a base drive.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
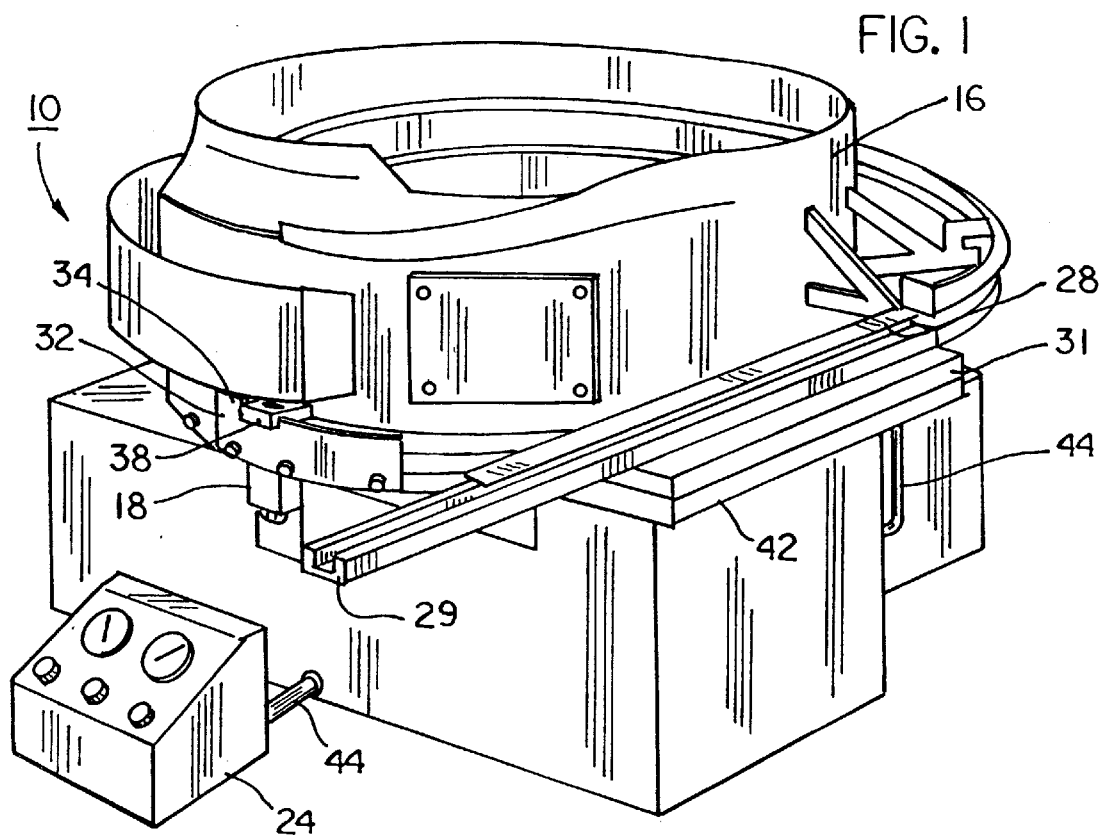
FIG. 1 is a perspective view of a vibratory parts feeding system constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, a vibratory parts feeding system having a vacuum hold down system, generally designated 10, is shown constructed according to the present invention.

As best seen in FIG. 2, the vacuum hold down system 10 includes at least two plates, an upper plate 12 and a lower plate 14, wherein the upper surface of upper plate 12 is suitably configured for attachment to and to receive a feeder bowl 16. The lower surface of the lower plate 14 is also configured for attachment to a vibratory base drive 18. Plates 12,14 are generally circular in shape, and are typically made of metal such as steel or aluminum. However, other shapes for plates 12,14 may be used to accommodate the feeder bowl 16. Further, plates 12,14 may be constructed with comparable materials, which will withstand the kind of movements and vibrations typically associated with moving articles through a vibratory parts feeding system.

Each of plates 12,14 has at least one peripheral groove 20 on its inner surface, which, when assembled, confront each other. A gasket or O-ring member 22 is positioned in groove 20 of one of the plates, e.g., the lower plate 14, and creates a pressure-tight joint with groove 20 of the upper plate 12 when vacuum is applied to system 10 by a vacuum source 24 through lines 44. Feeder bowl 16 is of generally a conventional construction with a bottom, generally an inverted frusto-conical side wall containing a spiral-shaped track extending around the inner surface to an outlet at the top. A vacuum port 26 located in the lower plate 14 provides an opening through which a vacuum is applied to plates 12,14.

The confronting surfaces of upper and lower plates 12,14 are spaced from each other because one or both plates 12,14 include slightly recessed central portions 13,15 respectively to form a chamber therebetween. When the vacuum source 24 is turned on via its on/off controls, gas is removed or evacuated from the chamber between upper plate 12 and lower plate 14. When this occurs, a coupling effect is achieved between the feeder bowl 16 and the base drive 18, thereby securing the bowl 16 to the base 18, but causing the vibrations of the base drive 18 to be transmitted to the feeder bowl 16. A track 28 is positioned adjacent to and in alignment with the feeder bowl 16. Track 28 is situated on a base support having a groove 20 and gasket 22 therein as well as a vacuum port 26.

Figure 3:
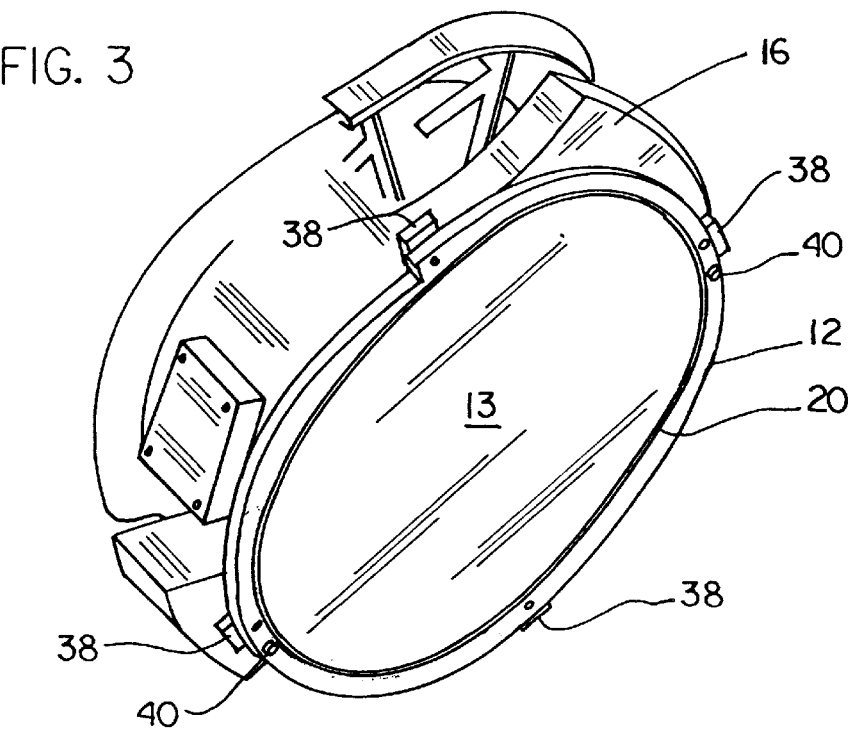
FIG. 3 is a bottom perspective view of the feeder bowl showing a preferred location of part of the positioning system and the portion of the vacuum chamber in the upper plate.
Figure 4:
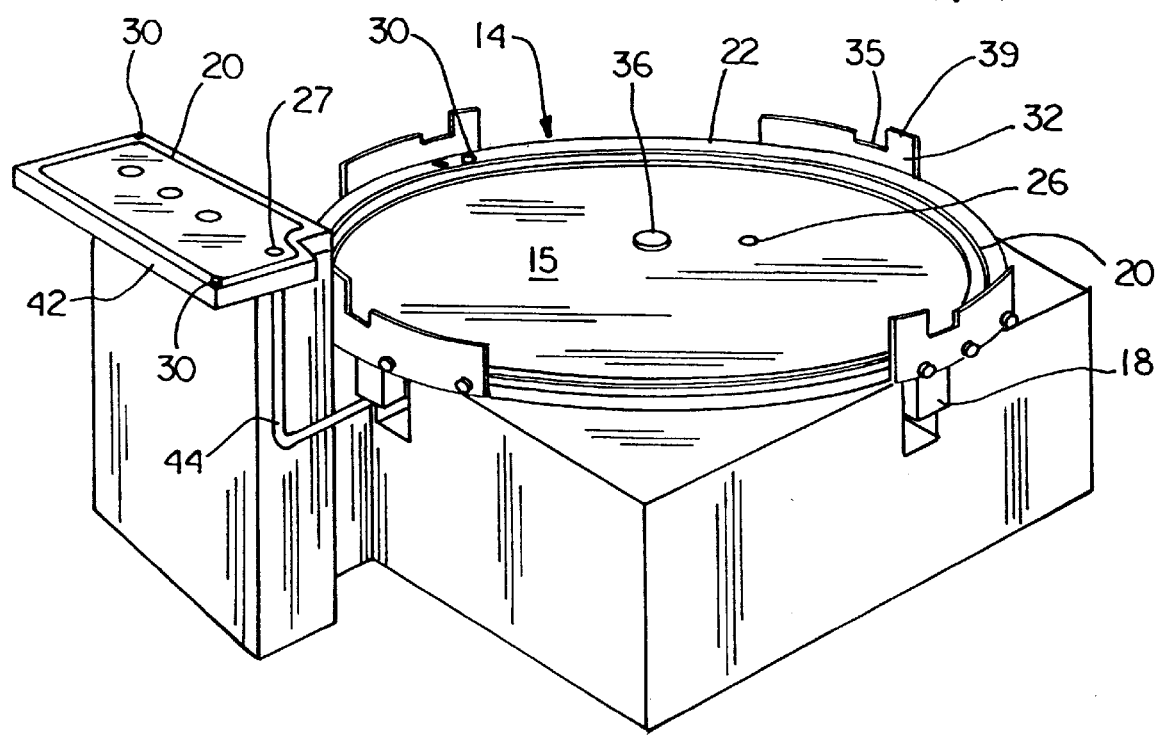
FIG. 4 is a top perspective view of the base drive showing a preferred location of another part of the positioning system and the portion of the vacuum chamber in the lower plate.

With reference to FIGS. 3 and 4, to facilitate the alignment of the upper plate 12 and attached feeder bowl 16 with the lower plate 14 and attached base drive 18, at least two dowel pins 30 are positioned diagonally adjacent the outer edge of lower plate 14. Dowel pins 30, upon alignment, will fit into corresponding holes in the upper plate 12. At least three guide blocks 32, each having an upstanding stop 34 and a recess 35, are secured to the periphery of lower plate 14 by bolts, and provide a further means for proper aligning the feeder bowl 16 with base drive 18. A raised pad 36 on the central portion 15 of lower plate 14 provides an auxiliary support for the weight of upper plate 12 and feeder bowl 16 prior to it lowering onto the O-ring.

The size of feeder bowl 16 may vary. Typical sizes are between about 6 inches to 48 inches in diameter. The overall dimensions of plates 12,14 are suitably designed to fit the size of the feeder bowl 16 that is pre-selected to hold and move the articles.

In operation, as the feeder bowl 16 is lowered onto the base drive 18, the guide blocks 32 and dowel pins 30 help to properly position the feeder bowl 16 over the base drive 18 and maintain correct alignment relative to the track 29. Once the inner surfaces of plates 12,14 are contacted with each other, the feeder bowl 16 is rotated to the point at which tabs 38, which protrude radially from the rim of the feeder bowl 16, lock into the corresponding recesses 35 on lower plate 14. When this occurs, there is no further rotational movement between the feeder bowl 16 and base drive 18. At this point, each of the dowel pins 30 in the lower plate 14 is properly fitted into an opening 40 located in abutting upper plate 12.

As shown in FIG. 1, track 28 is connected to its base support 42. Track 28 includes a mounting plate 31 secured thereto. The mounting plate 31 includes a central recessed portion similar to the central portion 13 of lower plate 12. Each of the mounting plate 29 and base support 42 have a groove 20 and gasket 22 therein, a chamber therebetween, and a vacuum port 27 in the base support 42. Once connected, the track 28 is properly aligned with feeder bowl 16 such that articles are easily moved from the feeder bowl 16 along track 28 to an outlet end 29 by vibrations from the base drive 18 when the vacuum source 24 is turned on.

The benefits derived from the vacuum hold down system 10 of the present invention are evident at this stage. No bolts or wrenches are required to tighten or remove the feeder bowl 16 or track 28 from the vibratory base drive 18. Once the feeder bowl 16 is positioned on the base drive 18 and the track 28 to its base support 42, vacuum source 24 is turned on and the pressure is delivered through conduits 44 to the vacuum ports 26,27 in lower plate 14 and track base support 42, respectively. When the pressure reaches a certain level, gas is evacuated from the chambers between plates 12,14 and the base support 42, resulting in the effective coupling of feeder bowl 16 to base drive 18 and track 28 to its base support 42. As a further result, the vibrations from base drive 18 are transmitted to the feeder bowl 16 and track 28.

As best seen in FIG. 3, the upper support plate 12 is preferably a separate component from the bowl feeder, however, they may be integrally formed in original equipment. Preferably, while the interface between the upper plate and lower plate must remain the same, several sizes of bowl feeders may be attached to the same size lower plate.

Although the level of pressure sufficient to achieve this coupling effect depends on the size of the feeder bowl 16, it has been found that sufficient pressure is produced between 15 and about 28 inches of mercury with a preferred pressure of about 28 inches. With the coupling effect, vibrations from the base drive 18 are transmitted to the feeder bowl 16 and track 28. As a result, articles are moved from the bottom of feeder bowl 16 and along its spiral-shaped track which extends around the inner periphery of the wall of the feeder bowl 16. The articles continue moving along track 28 and then on to the next stage in the production line.

To remove the feeding bowl 16 or track 28, the vacuum source 24 is turned off, thereby reducing the vacuum pressure through system 10. When the vacuum reaches near zero, the feeder bowl 16 or track 28 can be removed simply by lifting them from the base drive 18 and base support 42, respectively. Another feeder bowl 16 and/or track 28 with different feeding components can then be placed on the base drive 18 and the vacuum source restarted to begin the process for firmly attaching the feeder bowl 16 and/or track 28 to the base drive 18.

The improvement in efficiency by the present invention should not be underestimated. It takes approximately 20 seconds to secure the feeder bowl 16 to its base drive 18 using the vacuum hold down system 10 as compared to 20 minutes using conventional means such as bolts and wrenches.

Certain modifications and improvements will occur to those skilled in the art upon a reading of the foregoing description. By way of example, any standard vacuum source may be used to achieve the desired pressure to effectively couple the feeder bowl to its base drive or the track to its base drive. To facilitate handling of the feeder bowls particularly by robots, handles or other types of connecting members may be included as part of the feeder bowl an/or track. The number of guide blocks may vary depending on the size of the feeder bowl. As the vacuum source is turned off, a small amount of air pressure may be introduced into the vacuum hold down system to help reduce the vacuum and the coupling effect between the feeder bowl and its base drive and between the track and its base drive. Counterbalancing weights may be placed on the feeder bowl for balancing and alignment purposes. It should be understood that all such modifications and improvements have been deleted herein for the sake of conciseness and readability but are properly within the scope of the following claims.

We claim:

1. A vibratory parts feeding system, said apparatus comprising:
    (a) a feeder bowl having a bottom and a generally inverted frusto-conical side wall with a spiral shaped track extending around the inner periphery of said cylindrical wall to an outlet;
    (b) a vibratory base drive;
    (c) a feed track positioned adjacent to and in alignment with the inlet thereof aligned with the outlet of said feeder bowl;
    (d) a vibratory track drive; and
    (e) a vacuum hold down system for attaching said feeder bowl to said vibratory base drive, said vacuum hold down system including: an upper plate and a lower plate having confronting surfaces, said upper plate receiving said feeder bowl onto its upper surface and said lower plate being configured on its lower surface to mount to said base drive; said upper and lower plates, when assembled, having a chamber therebetween and being sealed therearound and a vacuum port in one of said upper and lower plates through which negative pressure is applied and gas is removed; whereby said feeder bowl is coupled to said base drive and the vibrations of said base drive are transmitted to said feeder bowl.

2. The apparatus according to claim 1, further including a positioning system for aligning said feeder bowl with respect to said vibratory base drive.

3. The apparatus according to claim 2, wherein said positioning system includes a plurality of guide blocks attached to the periphery of said lower plate.

4. The apparatus according to claim 3, wherein said guide blocks each include an upstanding stop and a recess, and said upper plate includes a corresponding number of radially extending tabs so positioned as to align with said recesses when assembled, thus rotationally locking the upper plate in position.

5. The apparatus according to claim 2, wherein said positioning system includes at least two dowel pins in a raised peripheral rim of said lower plate cooperating with complimentary holes in the upper plate.

6. The apparatus according to claim 5, wherein said dowel pins are positioned diagonally relative to each other.

7. The apparatus according to claim 1, wherein said track includes a mounting plate positioned on a base drive, the confronting surfaces of said mounting plate and base drive having a chamber therebetween and sealed therearound, said base drive having a vacuum port therein connected to said vacuum source, said base support also connected to said base drive, whereby said feed track is coupled by vacuum to said base support and vibrations from said base drive are transmitted to said feed track.

8. The apparatus according to claim 1, wherein said upper plate may be sterilizable.

9. The apparatus according to claim 1, wherein said lower plate is permanently attached to said base drive.

10. The apparatus according to claim 1, wherein said upper and lower plates are suitably adapted to fit a predetermined feeder bowl size.

11. The apparatus according to claim 10, wherein said feeder bowl is between about 80 mm to 1200 mm in diameter.

12. A vacuum hold down system for attaching a fixture to a vibratory base drive, said apparatus comprising:

(a) an upper plate and a lower plate having confronting surfaces, said upper plate being suitably adapted along its upper surface to receive said fixture and said lower plate being suitably adapted along its lower surface to mount to said vibratory base drive;

(b) said upper and lower plates, when assembled, having a chamber therebetween and being sealed therearound;

(c) a vacuum port positioned in one of said upper or lower plates through which negative pressure is applied and gas is removed; and (d) a vacuum source for supplying sufficient pressure through said vacuum port, whereby when said upper and lower plates are in sealed contact along their interior surfaces and the vacuum source is in operation, gas is removed from said chamber, resulting in the coupling of said plates and said fixture to said base drive and the transmission of the vibrations from said base drive to said fixture.

13. The apparatus according to claim 12, wherein at least one of said upper and lower plates includes a recessed central portion and a raised peripheral rim, and wherein at least one of said upper and lower plates includes a peripheral groove, and at least one plate having a gasket in said groove.

14. The apparatus according to claim 12, wherein one of said upper and lower plates further includes a raised pad in the center of said plate for supporting the weight of said opposite plate.

15. The apparatus according to claim 12, wherein said vacuum port is positioned in lower plate.

16. The apparatus according to claim 12, wherein said vacuum source operates at a vacuum pressure of between about 15 and about 28 inches of mercury.

17. The apparatus according to claim 16, wherein said preferred vacuum pressure is about 28 inches of mercury.

18. A vibratory parts feeding system, said apparatus comprising:

(a) a feeder bowl having a bottom and a generally inverted frusto-conical side wall with a spiral shaped track extending around the inner periphery of said cylindrical wall to an outlet;

(b) a vibratory base drive;

(c) a feed track positioned adjacent to and in alignment with the inlet thereof aligned with the outlet of said feeder bowl;

(d) a vibratory track drive;

(e) a vacuum hold down system for attaching said feeder bowl to said vibratory base drive, said vacuum hold down system including: (i) an upper plate and a lower plate having confronting surfaces, said upper plate being suitably adapted along its upper surface to receive said fixture and said lower plate being suitably adapted along its lower surface to mount to said vibratory base drive; (ii) said upper and lower plates, when assembled, having a chamber therebetween and being sealed therearound; (iii) a vacuum port positioned in one of said upper or lower plates through which negative pressure is applied and gas is removed; and (iv) a vacuum source for supplying sufficient pressure through said vacuum port, whereby when said upper and lower plates are in sealed contact along their interior surfaces and the vacuum source is in operation, gas is removed from said chamber, resulting in the coupling of said plates and said feeder bowl to said base drive and the transmission of the vibrations from said base drive to said feeder bowl; and (f) a positioning system for aligning said feeder bowl with respect to said vibratory base drive.

19. The apparatus according to claim 18, wherein said positioning system includes a plurality of guide blocks attached to the periphery of said lower plate.

20. The apparatus according to claim 19, wherein said guide blocks each include an upstanding stop and a recess, and said upper plate includes a corresponding number of radially extending tabs so positioned as to align with said recesses when assembled, thus rotationally locking the upper plate in position.

21. The apparatus according to claim 18, wherein said positioning system includes at least two dowel pins in said raised peripheral rim of said lower plate cooperating with complimentary holes in the upper plate.

22. The apparatus according to claim 21, wherein said dowel pins are positioned diagonally relative to each other.

23. The apparatus according to claim 18, wherein said track includes a mounting plate positioned on a base drive, the confronting surfaces of said mounting plate and base drive having a chamber therebetween and sealed therearound, said base drive having a vacuum port therein connected to said vacuum source, said base support also connected to said base drive, whereby said feed track is coupled by vacuum to said base support and vibrations from said base drive are transmitted to said feed track.

24. The apparatus according to claim 18, wherein said upper plate may be sterilizable.

25. The apparatus according to claim 18, wherein said lower plate is permanently attached to said base drive.

26. The apparatus according to claim 18, wherein said upper and lower plates are suitably adapted to fit a predetermined feeder bowl size.

27. The apparatus according to claim 26, wherein said feeder bowl is between about 80 mm to 1200 mm inches in diameter.

28. The apparatus according to claim 18, wherein at least one of said upper and lower plates includes a recessed central portion and a raised peripheral rim, and wherein at least one of said upper and lower plates includes a peripheral groove, and at least one plate having a gasket in said groove.

29. The apparatus according to claim 18, wherein one of said upper and lower plates further includes a raised pad in the center of said plate for supporting the weight of said opposite plate.

30. The apparatus according to claim 18, wherein said vacuum port is positioned in lower plate.

31. The apparatus according to claim 18, wherein said vacuum source operates at a vacuum pressure of between about 15 and about 28 inches of mercury.

32. The apparatus according to claim 31, wherein said preferred vacuum pressure is about 28 inches of mercury.

* * * * *